H. V. MORRIS.
SCRAPER AND LEVELER.
APPLICATION FILED OCT. 14, 1918.
1,333,815.
Patented Mar. 16, 1920.
3 SHEETS—SHEET 1.
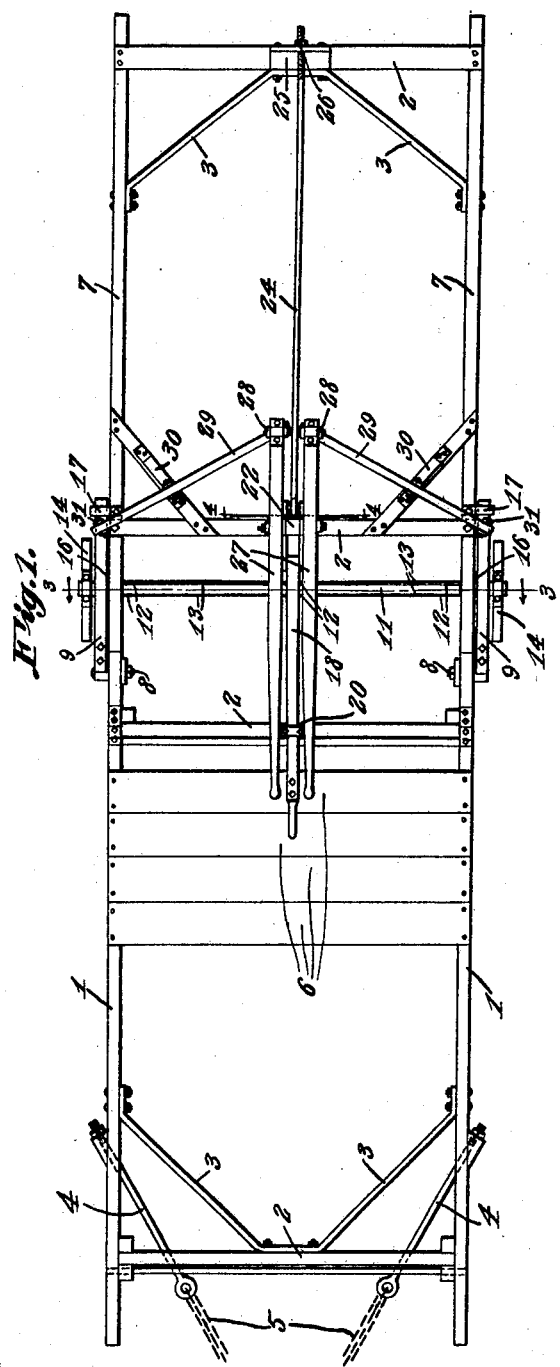
Inventor
H. V. Morris,
By C. A. Snow & Co.
Attorneys
Witness

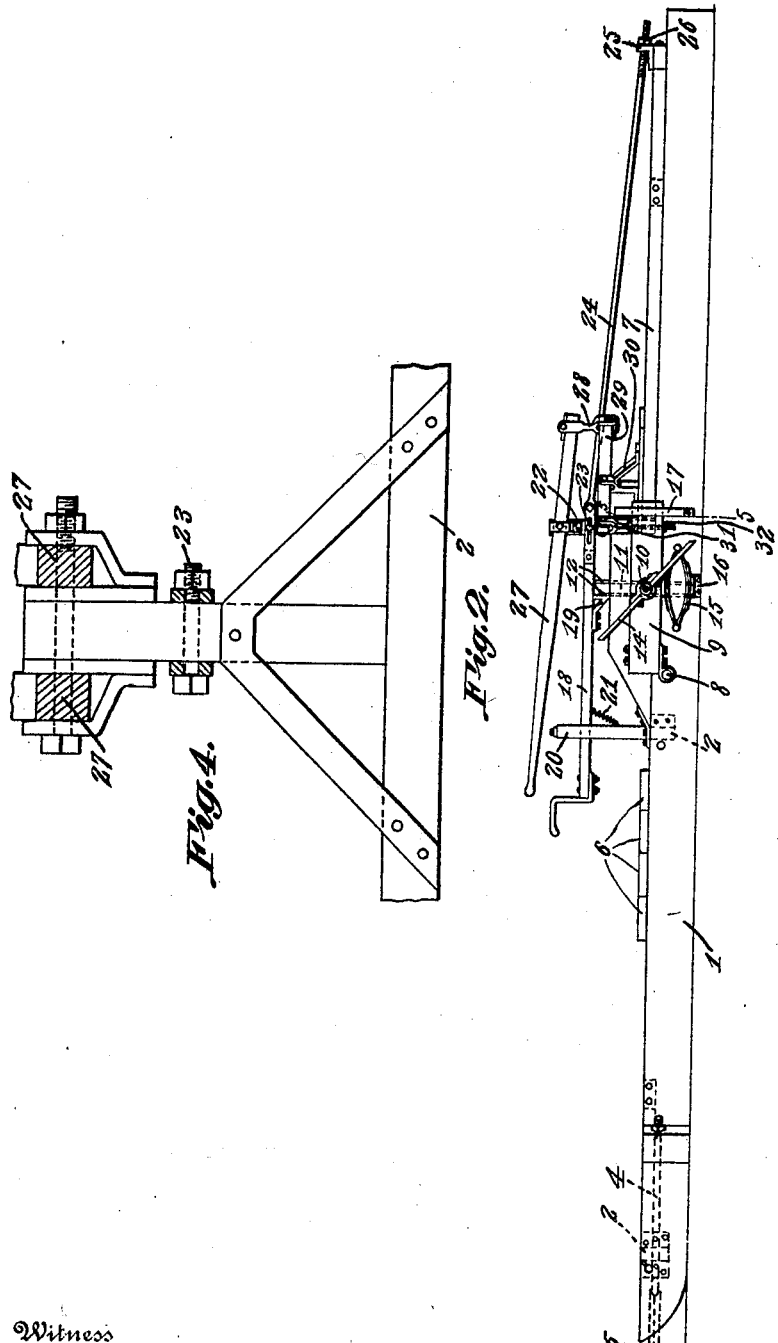

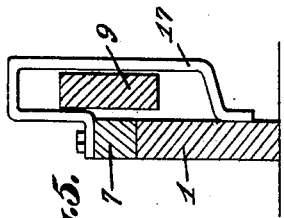
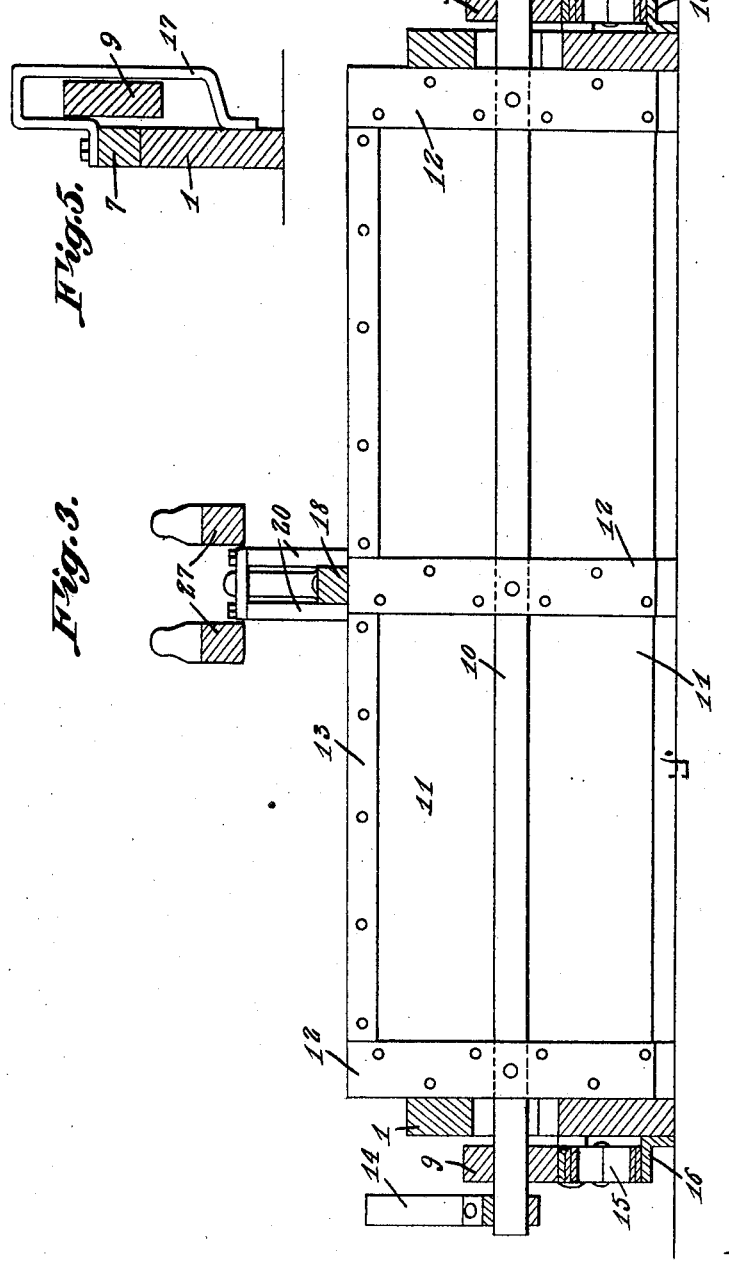

UNITED STATES PATENT OFFICE.

HARRY V. MORRIS, OF WOODLAND, CALIFORNIA, ASSIGNOR TO DAMON R. THROOP, OF DAVIS, CALIFORNIA.

SCRAPER AND LEVELER.

1,333,815.  Specification of Letters Patent.  Patented Mar. 16, 1920.

Application filed October 14, 1918. Serial No. 257,973.

*To all whom it may concern:*

Be it known that I, HARRY V. MORRIS, a citizen of the United States, residing at Woodland, in the county of Yolo and State of California, have invented a new and useful Scraper and Leveler, of which the following is a specification.

The subject of this invention is a scraper and leveler used for scraping and leveling land, especially land intended to be flooded for irrigation purposes.

The main object of the invention is the provision of a scraper and leveler which may be readily drawn by a tractor and which will remove soil from high spots and deposit the same in low places.

Another object of the invention is the provision of means for depositing the earth collected by the scraper in ridges or checks.

Another object of the invention is the provision of means for adjusting the position of the scraper blade.

Another object of the invention is the provision of means for releasing the scraper blade for rotation.

Another object of the invention is the provision of means for automatically restoring the scraper blade to operative position.

The invention also contemplates generally improving the construction and enhancing the utility of scrapers and levelers.

With the foregoing and other objects in view, which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

A practical embodiment of the invention is illustrated in the accompanying drawings, wherein:—

Figure 1 is a plan view of a scraper and leveler constructed in accordance with the invention;

Fig. 2 is a side elevation of the same;

Fig. 3 is a cross section taken on the line 3—3 of Fig. 1;

Fig. 4 is a detail sectional view taken on the line 4—4 of Fig. 1;

Fig. 5 is an enlarged detail taken on the line 5—5 of Fig. 2.

Referring to the drawings by numerals of reference:—

In carrying out the invention, a pair of runners 1 are provided, which are arranged in parallelism and which are connected by the cross pieces 2, and by the angled braces 3. Lug bolts 4 are secured in the forward ends of the runners and the forward cross piece 2, and chains 5 are secured to the eyes formed at the forward ends of these bolts for the purpose of connecting the scraper to a tractor or the like. Boards 6 may be secured across the runners 1 to form a platform upon which the operator may stand. Side pieces 7 may be secured to the upper edges of the runners 1, near the rear ends thereof, and these side pieces extend for a short distance longitudinally of the runners.

A stub shaft 8 is secured to each runner 1, at a point between the ends of the runner, and upon this shaft is pivotally mounted, for oscillation thereabout, the forward end of a side supporting strip 9. Each supporting strip 9 is apertured to journal a shaft 10, preferably formed of tubular material, the ends of which extend laterally beyond the supporting strips.

At diametrically opposite portions of the shaft 10 are placed planks 11, being two in number, which are bound to the shaft in any suitable manner, as by having strips or straps 12 riveted or otherwise secured to the faces of the planks. These planks are arranged to extend longitudinally of the shaft. The outer longitudinal edges of the planks 11 are beveled to form cutting edges, and to these edges are secured metal strips 13 which reinforce the edges and protect them from undue wear. On the laterally extending ends of the shaft 10 are secured cross arms 14, the arms, preferably, being set to form angles of sixty degrees with each other and with the scraper blade formed of the planks 11 as just described.

From the foregoing it will be evident that, should the scraper blade be free to revolve, the ends of the cross arms 14 would successively engage the ground and, as the scraper was drawn forward, would rotate the scraper blade.

For the purpose of yieldingly supporting the scraper blade, elliptical springs 15 are secured to the lower edges of the side supports 9, and rest upon brackets 16 which are secured to the runners 1. The side supports 9 are retained in proper position by having their free ends arranged to oscillate in guides 17, which are secured to the runners 1.

In order that the scraper blade may be restrained against rotation, and released to rotate at the will of the operator, a horizontally disposed lever 18 is mounted on the scraper with its forward end formed in a hand grip, and positioned adjacent the platform within easy reach of the operator. The forward end of this lever extends through a slot formed in an upright 20, which is secured to and rises from one of the cross pieces 2 and which acts as a guide for the lever. The lever is retained in its normal position by gravity, assisted by a retractile spring 21, one end of which is connected to the lever 18 while the other end is secured to the upright 20. In normal position, a latch 19, formed on the under side of the lever 18, or attached thereto, is in position to contact the upper edge of the scraper blade, at the forward face of the blade, and so retain the blade against rotation due to the pressure of earth against its lower edge.

The rear end of the lever 18 is bifurcated to straddle an upright 22, which is suitably secured to one of the cross pieces 2, to which the lever is pivoted by means of a bolt 23 or the like. To permit adjustment of the lever so that the scraper blade may be held at desired angles to the vertical, the bolt 23 passes through slots formed for a short distance longitudinally of the prongs of the bifurcated rear end of the lever 18, and to the rear end of the lever is pivotally secured the forward end of an adjusting rod 24, the rear end of which passes through an angle plate 25, suitably secured at the rear end of the scraper, and is threaded to receive a nut 26 which may be operated to adjust the position of the lever.

A pair of levers 27 are pivotally secured at the upper end of the upright 22, one on each side thereof, and these levers extend longitudinally of the scraper with their forward ends positioned adjacent the platform and within easy reach of the operator. The rear ends of these levers 27 are connected by links 28 with the respective rear ends of levers 29. The levers 29 are positioned below the levers 27 and are supported between their ends on supports 30, which are suitably secured to the scraper structure. To the respective forward ends of the levers 29 are secured hangers 31, which pass through apertures or bores formed adjacent the rear ends of the respective side supports 9. The hangers 31 are threaded to receive nuts 32, one engaging the upper and the other the lower edge of the side supports 9 so that the rear ends of the supports may be adjusted to adjust the depth of cut of the scraper blade.

The operation of the device is as follows:—When a field is being prepared for irrigation, or flooding, it is necessary that the same should be perfectly smooth, and that no low places should be left, as the water would collect therein and drown out the crops. It is also necessary that checks be built at proper intervals, these checks consisting in ridges of earth of suitable height and thickness for the purpose.

The scraper herein described and shown consisting of long runners, will insure the device passing over uneven land without dropping into every small hole or hollow which is passed over. This will insure the earth which is collected in front of the scraper blade being deposited in the hollows and smoothed out therein. The fact that the scraper blade may be raised or lowered by actuating the levers 27, also permits the earth to run under the scraper blade and be spread smoothly thereby to any desired depth.

When the land has been properly smoothed, the scraper is drawn over the land and earth collected in front of the scraper blade. When sufficient earth has been collected, the forward end of the lever 18 is raised, releasing the scraper blade which will, because of the pressure of the earth in front of it, immediately rotate, thus leaving the earth in a ridge. As the blade rotates, the ends of the cross arms 14 will come in contact with the ground and insure rotation of the blade back to latched and operative position.

What I claim as my invention, is:—

1. A scraper and leveler, including a frame, a scraper blade supported in the frame and rotatable therein, releasable means for locking the blade against rotation, and means for adjusting the locking means to hold the blade in adjusted positions.

2. A scraper and leveler, including a frame, side supports pivotally secured to the frame, a scraper blade carried by the supports and rotatable therebetween, means for oscillating the supports to move the blade vertically, releasable means for locking the blade against rotation, means for adjusting the releasable means to hold the blade in adjusted positions, and means for rotating the blade, when released to operative position.

3. In a device of the class described, a frame comprising side members; supports pivoted thereto for vertical swinging adjustment; means under the control of an operator for swinging the supports; a shaft journaled in the supports; a scraper blade located between the side members and secured to the shaft; and ground engaging arms on the shaft and disposed externally of the side members, the ground engaging arms being disposed at an angle to the blade.

4. In a device of the class described, a frame comprising ground engaging runners; supports pivoted to the runners for vertical swinging adjustment and located externally of the runners; means under the control of an operator for swinging the supports; a shaft journaled in the supports; a scraper blade carried by the shaft and substantially filling the space between the runners; and compression springs carried by the outer surfaces of the runners and constituting cushioning elements for the supports.

5. In a device of the class described, a frame; a scraper rotatable in the frame; a lever engaging the scraper to hold the same against rotation; means for mounting the lever on the frame for swinging movement and for longitudinal adjustment; a connection pivoted to one end of the lever; and means for uniting the connection adjustably with the frame.

6. In a device of the class described, a frame; supports mounted on the frame for vertical swinging adjustment; a scraper blade mounted to rotate in the supports; means under the control of an operator for holding the blade against rotation; first levers fulcrumed intermediate their ends on the frame and having their outer ends connected with the supports; and second levers fulcrumed intermediate their ends on the frame, the second levers being pivoted to the inner ends of the respective first levers.

In testimony that I claim the foregoing as my own, I have hereto affixed my signature in the presence of two witnesses.

HARRY V. MORRIS.

Witnesses:
F. L. MORRIS,
D. R. THROOP.